United States Patent [19]

Minoo

[11] Patent Number: 4,796,257
[45] Date of Patent: Jan. 3, 1989

[54] BIPOLAR VIOLATION RATE CALCULATION METHOD

[76] Inventor: Dariush Minoo, 2 Horseman's La., Muttontown, N.Y. 11791

[21] Appl. No.: 926,487

[22] Filed: Nov. 3, 1986

[51] Int. Cl.$^4$ ............................................. G06F 11/14
[52] U.S. Cl. ........................................... 371/5; 371/55
[58] Field of Search .......................... 371/5, 6, 55, 22; 375/10; 370/13

[56] References Cited

U.S. PATENT DOCUMENTS

| | | | |
|---|---|---|---|
| 3,618,015 | 11/1971 | Homonick | 371/5 |
| 3,872,431 | 3/1975 | Besenfelder | 371/5 |
| 4,042,794 | 8/1977 | Lima | 375/10 |
| 4,234,953 | 11/1980 | Kline | 371/5 |

OTHER PUBLICATIONS

Transmission Systems for Communications Fifth Edition; pp. 742-746.

Primary Examiner—Jerry Smith
Assistant Examiner—Robert W. Beausoliel
Attorney, Agent, or Firm—David N. Caracappa

[57] ABSTRACT

The present invention describes an improved method of calculating the bipolar violation rate (BPV) in DS1 signal transmission which may be implemented in a computer program subroutine which efficiently and without undue processing steps will accurately generate alarms when the bipolar violation rate exceeds predetermined service affecting and non-service affecting and other desired thresholds. These rates are automatically computed over different time intervals depending upon the quantity of errors which are detected such that for the case of a large number of errors only a short duration time interval is examined in the course of calculation of the bipolar violation rate while in the case of few errors a longer timing interval is automatically examined and utilized in the course of calculation of the bipolar violation rate, all for the purpose of accurately generating alarms when necessary.

6 Claims, 4 Drawing Sheets

BIPOLAR VIOLATION RATE CALCULATION METHOD

CROSS REFERENCE TO RELATED APPLICATION

Henry P. Segal, et al; Ser. No. 758,990; filed 7/25/85; A Digital Carrier Channel Bus Interface Module For a Multiplexer Having a Cross-Connect Bus System.

BACKGROUND OF THE INVENTION

1. Field of the Invention

The present invention relates to the field of digital signal transmission and to the detection of bipolar line coding violations in digital signal transmission.

2. Description of the Prior Art

As is well known in the prior art, a single PCM channel known as a DS0 channel operates at 64 Kb/sec in each direction of transmission to transmit and receive 8,000 8-bit samples per second of a desired telecommunication transmission, whether voice or data. In accordance with Bell standards, individual bidirectional channels are multiplexed into higher speed channels for long distance transmission. For example, twenty-four DS0 channels may be multiplexed into a DS1 channel or hierarchial level operating at 1.544 Mb/sec. In accordance with this format, 24 8-bit samples, one from each DS0 channel, are arranged serially in a single transmission frame together with a single framing bit to form a 193-bit frame. The bit rate of 1.544 Mb/sec. is arrived at by transmission of successive 193 bit frames at a transmission rate of 8,000 frames per second.

DS1 signal transmission of the type described hereinbefore is typically line coded in a bipolar line coded format which bipolar coding is a form of ternary coding in which the signalling rate is equal to the input binary rate. Binary "ones" are represented by either positive or negative pulses and binary "zeros" are represented by the absence of a pulse. In bipolar coding format the polarity of the signal level is changed at each occurrence of a logical one. Errors in transmission whether pulse deletion or pulse addition result in a coding violation called a bipolar violation (BPV). For example, two positive level ones or two negative level ones in a row would constitute a bipolar violation and would be indicative of an error. Bipolar line coding and error detection is well known in the prior art and reference can be made to standard reference material for a more detailed description thereof, such as Transmission Systems for Communications, Fifth Edition, Bell Telephone Laboratories Inc. 1982 at pages 742 through 746 thereof.

In order to properly correct the aforementioned bipolar violations which occur in bipolar line coding, it is necessary to monitor the line status during transmission to measure and count the occurrences of such bipolar violations and to raise alarms when the error rate exceeds certain threshold criteria, known in the telecommunications transmission field as service affecting and non-service affecting thresholds, so that appropriate remedial action can be taken if necessary. Typically a service affecting threshold would be the cause of a major alarm and might represent one error in each 1,000 bits of transmission; while a non-service affecting threshold level of bipolar violation would cause a minor alarm and might be indicative of an error transmission rate of one error in each million bits of transmission.

In accordance with the present invention, an improved technique for calculating bipolar error violations is disclosed.

SUMMARY OF THE INVENTION

The present invention describes an improved method of calculating the bipolar violation rate (BPV) in DS1 signal transmission which may be implemented in a computer program subroutine which efficiently and without undue processing steps will accurately generate alarms when the bipolar violation rate exceeds predetermined service affecting and non-service affecting and other desired thresholds. These rates are automatically computed over different time intervals depending upon the quantity of errors which are detected such that for the case of a large number of errors only a short duration time interval is examined in the course of calculation of the bipolar violation rate while in the case of few errors a longer timing interval is automatically examined and utilized in the course of calculation of the bipolar violation rate, all for the purpose of accurately generating alarms when necessary.

BRIEF DESCRIPTION OF THE DRAWINGS

FIGS. 1 through 4 are flowcharts which set forth the preferred embodiment of applicant's invention wherein:

FIG. 1 is illustrative of the pointers and indexes that are used for referencing data useful in the present invention, FIG. 2 is illustrative of the processing done on the BPV count which is obtained from the referenced data, FIG. 3 is illustrative of various checking done on timing cycles involved in the present invention and of adjustments made to the pointers and indexes, FIG. 4 is illustrative of the processing required when the BPV counts are 0.

DESCRIPTION OF THE PREFERRED EMBODIMENT

Figure 1:
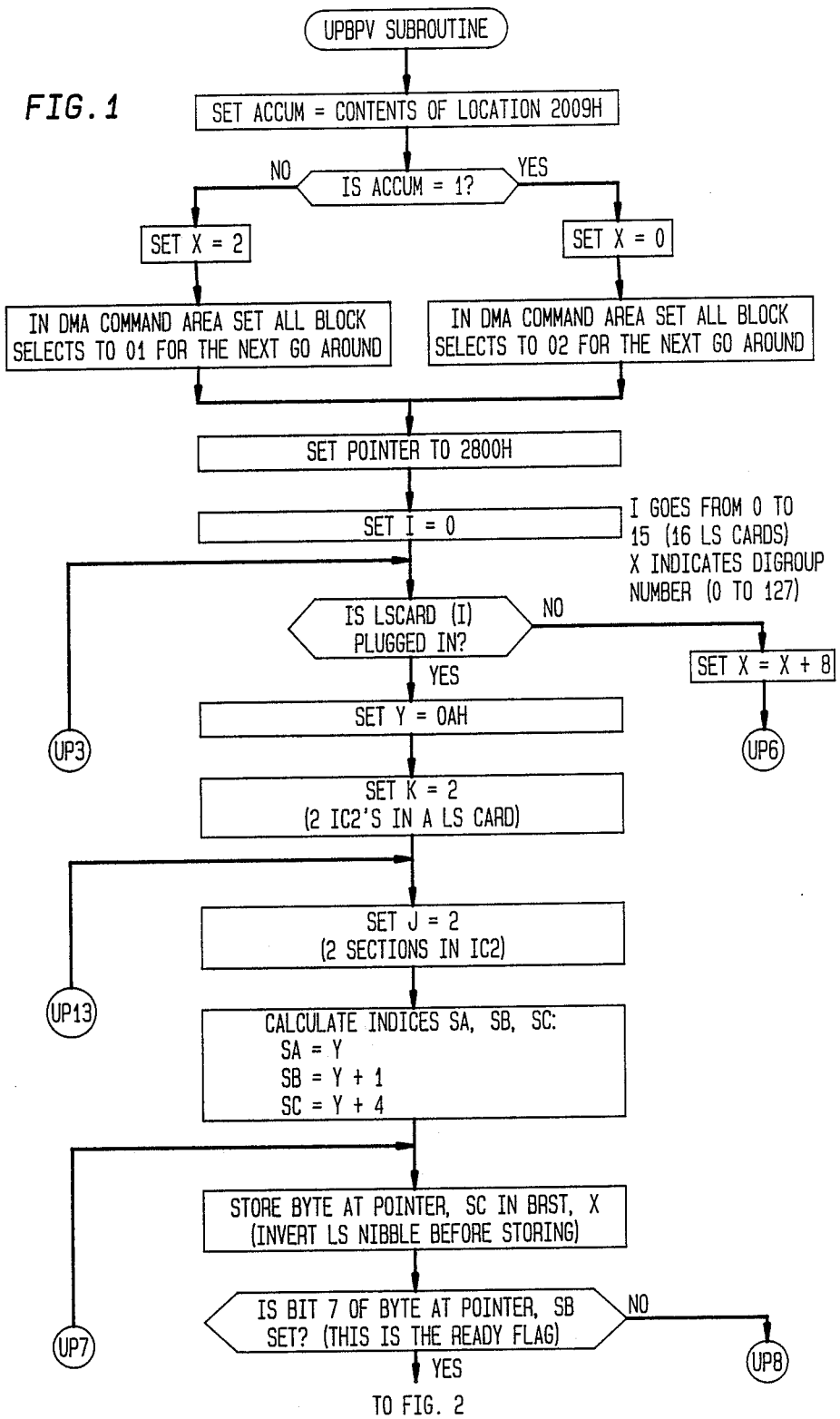

The bipolar violation (BPV) calculation subroutine is a subroutine which is executed from a main loop background program and is called up by a direct memory access (DMA) handler, and is entered whenever DMA is finished (the DMAFIN is active) and there are no new maps, or areas of a RAM memory in which BPV data is stored, to be sent out. These areas are called the SWAPIN areas. Each time the BPV subroutine is called by the DMA handler, it calculates the BPV of up to 64 digital transmission groups (Digroups) and enables a designated internal processor to obtain data for calculation of the BPV rates for the other 64 D1 groups upon the next call to the BPV subroutine. Two status bytes, a high byte and a low byte, from the accessed internal processor provides the number of bipolar violations (BPVs) for each one million DS1 bits (647 ms). The setting of the most significant bit of the high status byte indicates that the BPV count in the status byte is ready to be read, that is the BPV count for one million DS1 bits has been accumulated. This count is processed by the BPV subroutine and the result is output into two bytes.

For every digroup there are 2 bytes, BPVRTH and BVPRTL. The most significant bit of BVPRTH designates an exponent wherein one means $10^{-6}$ and 0 means $10^{-8}$. The other 15 bits in BPVRTH and BPVRTL designate the binary count of the BPV rate. Thus an MSB of BPVRTH equal one designates a BPV rate equal to a count $\times 1.0$ E-6. An MSB of BVPRTH=0 means a BPV rate=count×1.0E-8. An MSB of BVPRTH=0 and a count equal to 0 means a bipolar violation rate (BPV) less than 1.0E-8.

For every digital transmission group (digroup) there are 3 timers: a 2.5-second timer (5-bits), a 5-minute timer (11-bits), and another 5-minute timer (11-bits) for 0 BPV counts. There is an accumulator associated with each of the first two timers (the 2.5-second timer and the 5-minute 11 bit timer) which accumulates the BPVs over the 2.5-second or the 5-minute intervals. These are designated as BPV count 1, which is the count for the 2.5-second timer, and is one byte long; and BPV count 2, which is the count for the 5-minute timer, and is 12-bits long. Before processing the high and low status bytes, their least significant data nibbles are inverted. Arbitrarily, if the BPV count in one million DS1 bits is greater than 9, then the MSB of BPVRTH is set and the count is set equal to the BPV count. Accumulators BPV count 1 and BPV count 2 are set to 0 and the 2.5-second and both 5-minute timers are reset to 0. If the BPV count in one million DS1 bits is 0, the 5-minute timer for 0 BPV counts is incremented. When this timer reaches 400, which occurs after 4 minutes and 18.8 seconds, this approximates a 5-minute interval and at this time, BPVRTH and BPVRTL are set to 0 to indicate a less than 1.0E-8 (exponential) BPV rate. The 5-minute timer of 0 BPV counts is then set to 0. For less than 10 BPV counts in one million DS1 bits, the 2.5-second and 5-minute timers are incremented and the BPV counts are accumulated separately as BPV count 1 and BPV count 2. When the 2.5-second timer reaches a count of 4, after 2.588 seconds, this approximates the 2.5-second interval, the MSB of BPVRTH is set and the count is set equal to the BPV count which is accumulated in BPV count 1 divided by 4. The BPV count 1 is then set to 0. When the 5-minute timer reaches 400, that is, after 4 minutes and 18.8 seconds, this interval approximates the 5-minute interval, the MSB of BPVRTH is reset and the count is set equal to the BPV count accumulated in BPV count 2 divided by 4. The 5-minute timer and BPV count 2 are then set to 0.

DESCRIPTION OF THE FLOWCHARTS

Referring now to FIGS. 1 through 4, the bipolar violation (BPV) calculation subroutine flowchart in assembly language is illustrated. This is implemented, for example, on a Rockwell Processor Model 65C02, and the nomenclature used in the subroutine is the processing language that is required to describe the actual processing operations to a programmer implementing the subroutine. The subroutine described is utilized to calculate the bipolar violation rates and it is these rates that are looked at by other alarm subroutines to generate the appropriate service affecting or nonservice affecting indicia in response to the calculated bipolar violation rates. The designation UP throughout the subroutine means "go to". Upon initiating the UPBPV subroutine 1, an accumulator is set to accumulate the contents of location 2009H, which is an exemplary location in a diagnostics RAM on a CCM45 cross-connect equipment which can be considered a diagnostics storage unit. Reference may be made to cross-referenced patent application Ser. No. 758,990 for a description of a digital cross-connect, such as the CCM45, however, for purposes of the present invention it is sufficient that the indicated locations are any desired location or block of digroup data on the desired RAM. Depending upon whether the accumulator indicates "1", internal processing steps determine whether a direct memory access (DMA) command area on the diagnostic RAM is set to a particular location for the next go around. The next step is to set the pointer to another desired diagnostic RAM location i.e. 2800H at 2, and to access a particular data card from 0 to 15 which includes data from a particular digroup number such as from 0 to 127. The LS card I represents the low speed card index where the low speed card is a group of DS1 circuits for transmitting data at 1.544 M-bits/sec. Various data locations of indexes are accessed at K, J, SA, SB, and SC. SA and SB represent the 2 bytes of the BPV count for which the BPV rates are calculated. All of the other indexes such as K, and J are used for accessing internal assembly processing data which enables the various pointers and index used for referencing the necessary circuits (IC2) wherein the DS1 signal is put into the correct format and the bipolar violation count is extracted. These integrated circuits are physically located at the CCM45 cross-connect equipment and only the necessary substeps in the subroutine are described which enable a programmer to access information from the necessary integrated circuits. The ready flag is generated at 3 of the subroutine.

Figure 2:
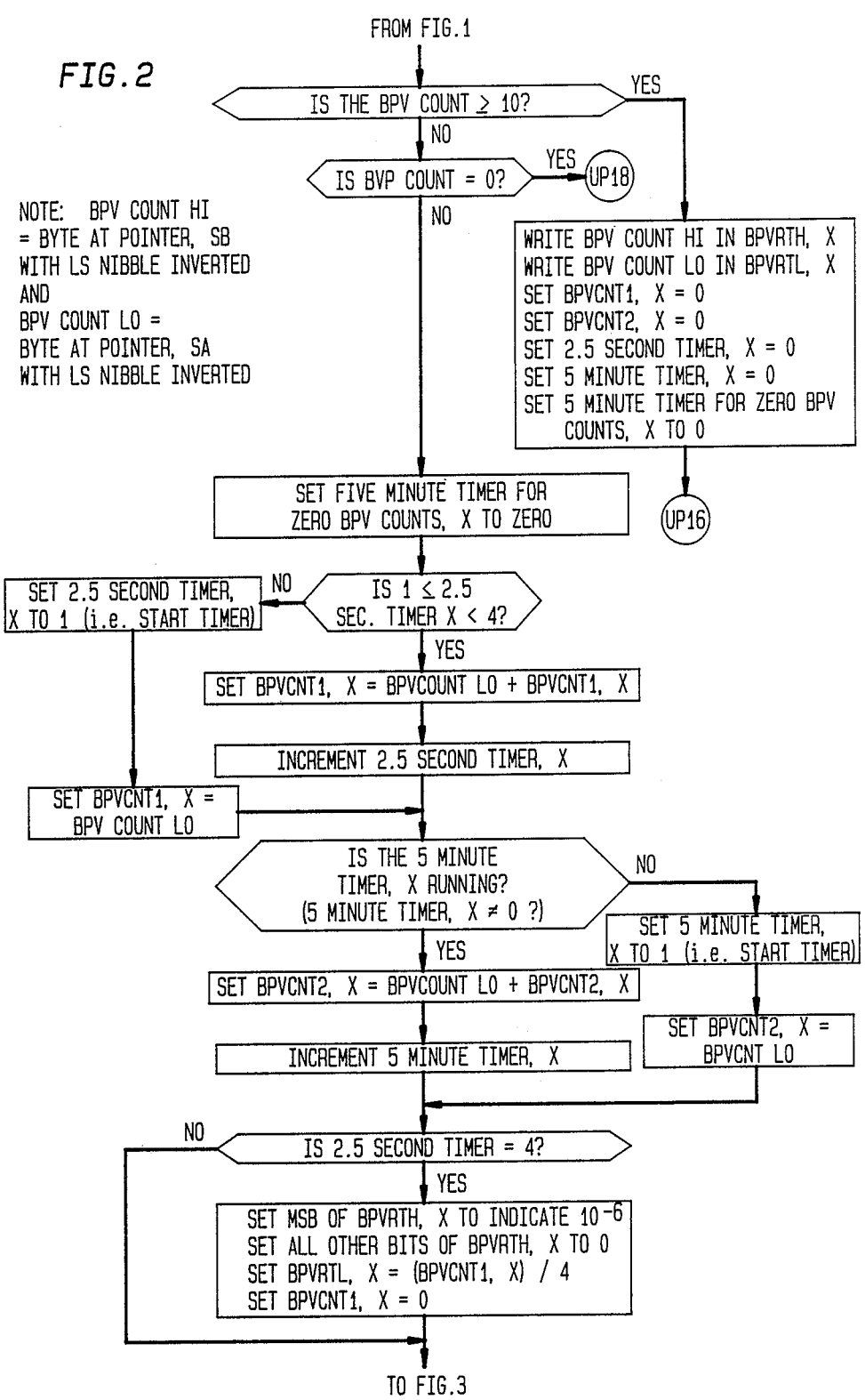

With reference to FIG. 2 of the flowchart, the processing to be done on the BPV count obtained from the IC2 is illustrated. If the BPV count is greater than 9 the BPV rate is set to the BPV count multiplied by $10^{-6}$ and the timers and accumulators are set to 0. This is indicated in the block 10 of initialized conditions of FIG. 2. If the BVP count is between 1 and 9, the 5-minute timer for 0 BPV count is set to 0. If the 2.5-second timer is not running, it is started and its accumulator is set to the BPV count. If the 2.5-second counter was running, it is incremented and the BPV count is added to its accumulator. Similarly the 5-minute timer is checked. If it is not running, it is started and its accumulator is set to the BPV count. If it was running, it is incremented and the BPV count is added to its accumulator. This can be seen from the sequence of substeps of FIG. 2. Referring to block 12 of the sequence of substeps of the subroutine, to the checking done on the 2.5-second timer and on the 5-minute timer to determine if they have reached their time out values, the remainder of the steps of the subroutine of FIG. 2 are illustrative of the foregoing. When the 2.5-second timer reaches four, a time equal to 4×0.647 seconds i.e. 2.588 seconds, from the time the timer was started has elapsed. If this condition is true the BPV rate will be set to ¼ times the BPV count that is in the accumulator associated with the 2.5-second timer, times $10^{-6}$, and the accumulator is set to 0. When the 5-minute timer reaches 400, 400×0.647 seconds (4 minutes and 18.8 seconds) which approximates the intended 5-minute interval from the time it was started has elapsed. If this condition is true, the BPV rate is set to ¼× the BPV count that is in the accumulator associated with the 5-minute timer, ×$10^8$, and the accumulator is set to 0.

Figure 3:
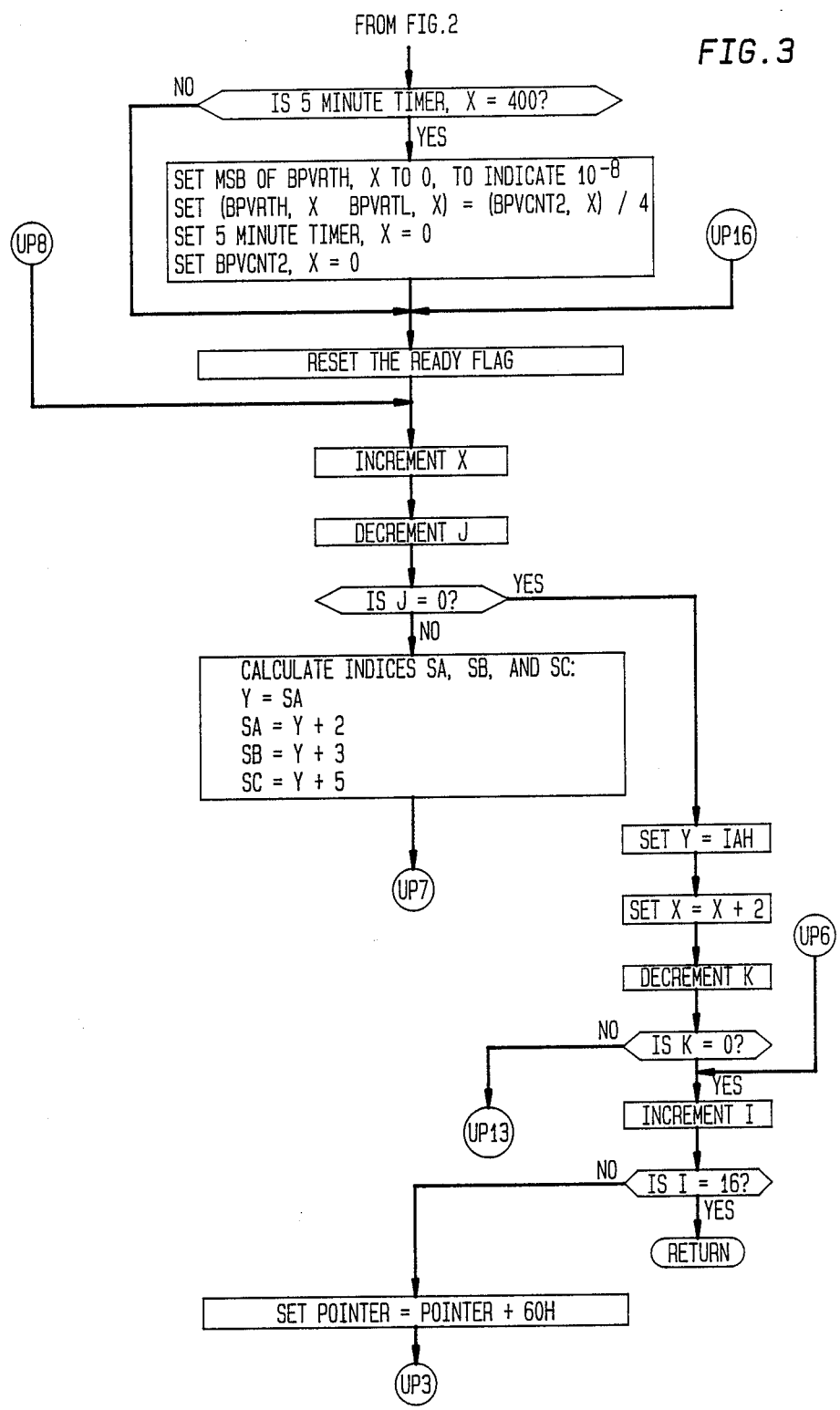

The remainder of the substeps of FIG. 3 illustrate the adjustment made to the pointers and indicies that are necessary to allow the BPV rate computations to continue for the next digroups that are accessed or the next low speed DS1 cards.

Figure 4:
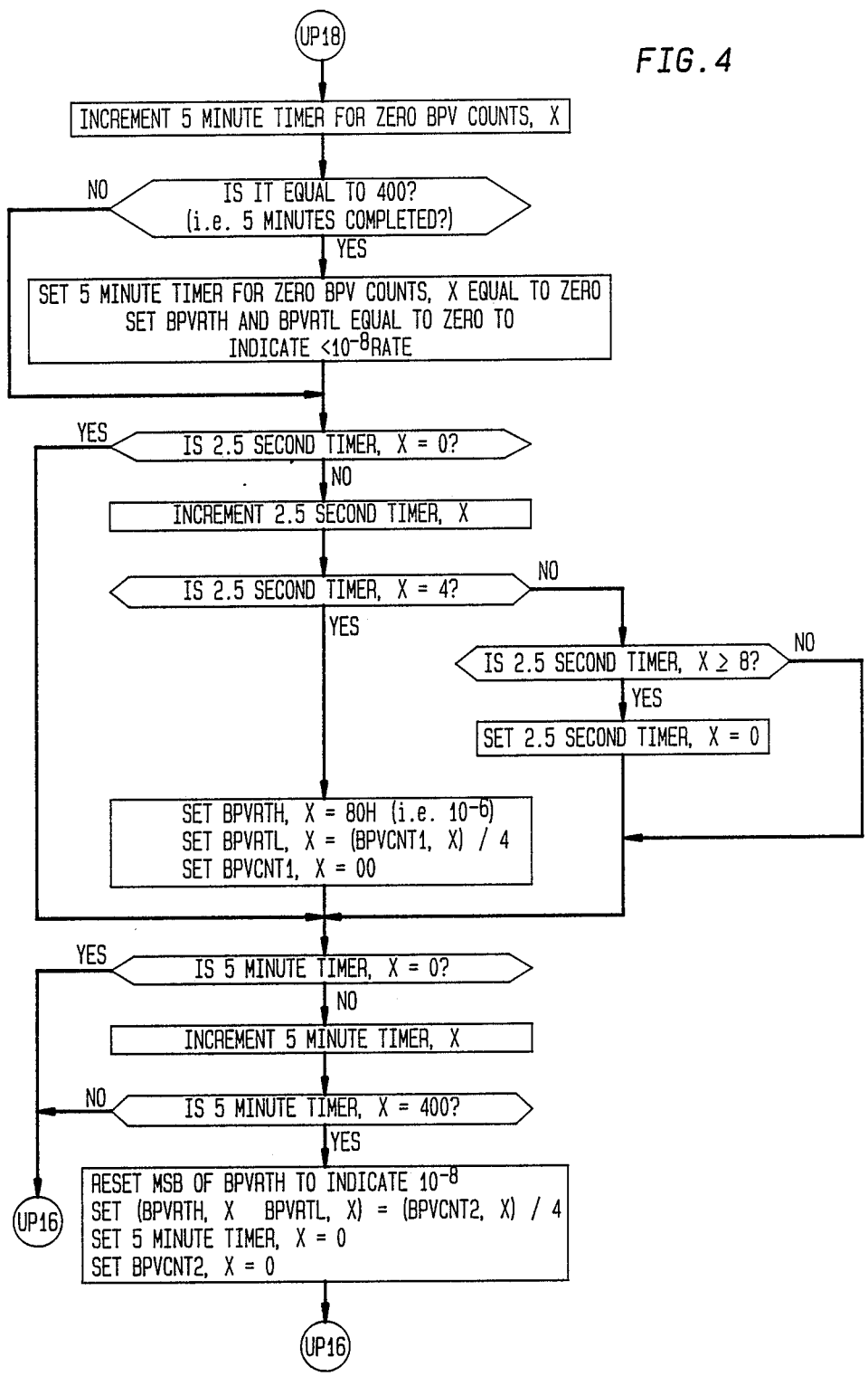

Referring to the portion of the BPV calculation subroutine illustrated at FIG. 4, the processing done when the BPV counts are 0 is illustrated. At subroutine step 20, it can be seen that the 5-minute timer for 0 BPV counts is incremented. If the timer count is equal to 400, about 5 minutes from the time the timer was started in total elapsed time, the BPV rate will be set to show a rate of less than $10^{-8}$ and the 5-minute timer for 0 BVP counts is set to 0. This can be seen at subroutine step 22. If the 5-minute timer was started, it will be incremented. When the 5-minute timer reaches 400, that is $400 \times 0.647$ seconds, 4 minutes and 18.8 seconds which approximates the intended 5-minute interval, from the time the timer was started. If this condition is true, the BPV rate is set to $\frac{1}{4} \times$ the BPV count that is in the accumulator associated with the 5-minute timer, $\times 10^{-8}$, and the accumulator is set to 0.

The foregoing sequence of substeps in the illustrated subroutine describes a preferred embodiment of an actual computer program used for implementing the improved bipolar violation rate calculation in accordance with the present invention. It is to be understood that additional embodiments modifications and applications which will become obvious to those skilled in the art are included within the spirit and scope of the invention as set forth by the claims appended hereto.

What is claimed is:

1. A method for calculating the bipolar violation (BPV) rate of a bipolar coded DS1 signal transmission, comprising the steps of:

accessing desired diagnostic data stored in Random Areas Memory (RAM) for obtaining information indicative of the BPV count in the data stored in the RAM;

processing the information indicative of the BPV count to make an initial determination of whether the BPV count exceeds a first predetermined threshold numerical value within a designated first time duration;

generating a first output indicator signal when the BPV count exceeds said first predetermined threshold numerical value within said designated first time duration;

generating a second output indicator signal when the BPV count does not exceed said predetermined threshold numerical value within said designated first time duration, but exceeds a second predetermined threshold numerical value within a designated second time duration, greater than said first time duration; and utilizing said first and second indicator signals to initiate major and minor alarms respectively for diagnostics associated with said DS1 signal transmission, wherein said major alarm corresponds to a first predesignated BPV rate and said minor alarm corresponds to a second predesignated BPV rate.

2. A method in accordance with claim 1 including the further step of generating a third output indicator signal when the BPV count is zero.

3. A method in accordance with claim 1 wherein the data stored in the RAM is partitioned into data blocks representative of BPV counts of a plurality of digroups.

4. A method in accordance with claim 1 wherein said first designated time duration is approximately 2.5 seconds and wherein said second designated time duration is approximately 5 minutes.

5. A method in accordance with claim 1 wherein the step of generating a second output indicator signal is not initiated when a first output indicator signal is generated.

6. A method in accordance with claim 1 wherein the step of generating a second output indicator signal is initiated when a first output indicator signal is not generated.

* * * * *